Oct. 13, 1936.  C. L. EKSERGIAN  2,057,565
VEHICLE WHEEL
Filed Oct. 8, 1934
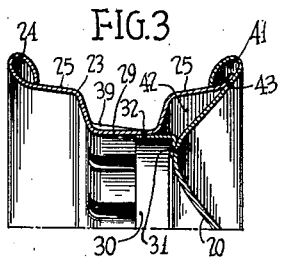
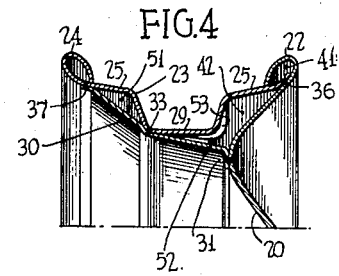
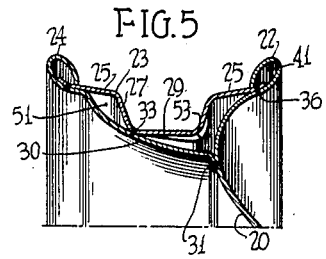
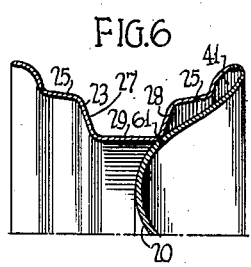
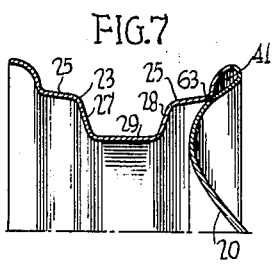
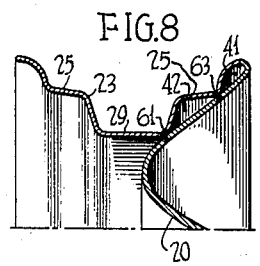
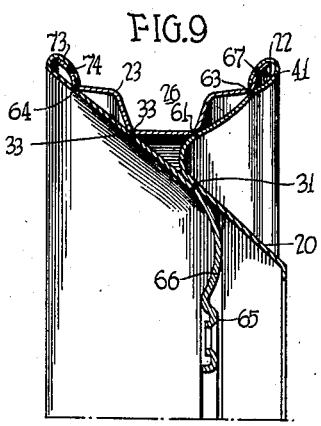
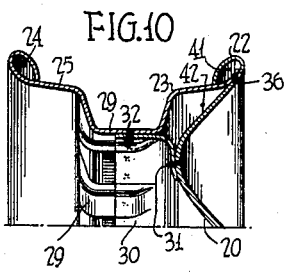
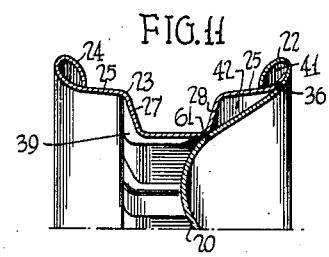
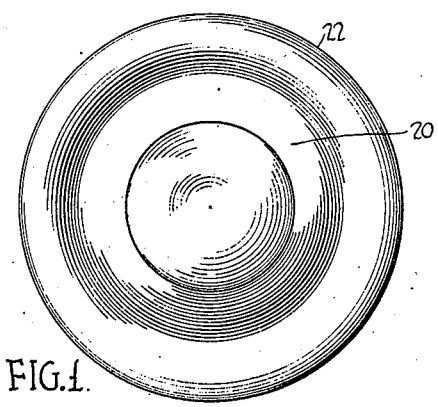
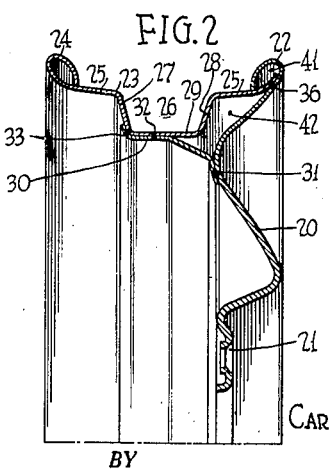
INVENTOR.
CAROLUS L. EKSERGIAN
BY
ATTORNEY.

Patented Oct. 13, 1936

2,057,565

UNITED STATES PATENT OFFICE 2,057,565

VEHICLE WHEEL

Carolus L. Eksergian, Detroit, Mich., assignor to Budd Wheel Company, Philadelphia, Pa., a corporation of Pennsylvania Application October 8, 1934, Serial No. 747,369

3 Claims. (Cl. 301—5)

This invention relates to vehicle wheels and more particularly to metallic vehicle wheels having very light weight rim members and substantially disc like wheel bodies.

In modern high speed vehicle construction it is highly important to build vehicle wheels of great strength, pleasing appearance, and of light weight in such a manner as to reduce the moment of inertia and fly wheel effects.

I have attained the foregoing and other objects of my invention by constructing a wheel with a disc like body member and a rim portion of very light gauge metal, the two complementally forming a wheel body having plural substantially tubular annularly extending parts between the rim and wheel providing great strength and light weight.

This application is one of a series of four relating to the same general subject matter, the others being Serial Nos. 747,370, 747,371 and 747,372.

In the drawing,

Figure 1 is a front elevation of a wheel according to this invention.

Figure 2 is an axial cross section of a wheel of this invention.

Figures 3, 4, 5, 6, 7, 8, 9, 10 and 11 illustrate variations of the detail structure while retaining the common characteristics throughout.

The wheel body of Figure 1 has substantially continuous arcuate contour lines in its outboard appearance, thus removing points of accumulation of dirt, facilitating washing of the wheels and providing a pleasing appearance. The wheels of these characteristics involving detailed variations are illustrated in the remaining figures. In the detailed embodiment as shown in Fig. 2, the wheel is basically shown as being comprised of three members, each substantially annular in extent.

Part 20 comprises a disc wheel body having a mounting flange portion 21 and a peripheral portion 22, the latter of which is preferably of reduced thickness. Thus there may be utilized a tapering thickness wheel body, although this latter construction is not necessarily essential, as the reduced thickness portion may be limited to the peripheral part alone.

A very light gauge annular member 23 provides the major portion of a rim having a hollow bead portion 24 of great strength and tire bead seats 25 with the drop center portion 26 formed by the side walls 27, 28 and the drop base portion 29.

The third member completing the wheel body is an annulus 30 preferably secured to the wheel body at 31 by welds, rivets or other suitable means and to the drop base portion of the rim member at 32 and the side wall of the drop center at 33, each of these outer connections being by suitable fastening means.

The wheel body 20 is curled at its outer periphery, completing the hollow rim wall in the axial outboard direction and being secured at 36 preferably by welding. It is thus seen that I have attained a light weight wheel body of great strength due to the uniform dissipation of loads in a radial direction and the great resistance to impact in an axial direction, due to the multiple hollow construction. In each of these structures it is seen that the light weight rim member and the wheel body provide hollow substantially tubular tire retaining flanges, this hollow portion being at the point 41 in each of the figures. This manner of construction is illustrated with variations of the component elements for purposes of clearness and to illustrate the scope of the invention.

In Figure 2 the wheel body continues outwardly and provides the entire bead member 22 in this construction, whereas the drop center is reinforced by an annulus 30 providing an additional tubular portion 42. In Figure 3 this strong type of construction is obtained by an annular member 30 secured at 31 and 32 as shown, the tire bead portion being a part of the integral rim annulus with the wheel body 20 reinforcing the same at the point 43. Providing added strength to the drop center portion is the ribbing at 39.

A further variation of the fundamental elements is observed in Figure 4 where the construction of Figure 2 is basically utilized providing the hollow tubular sections 41 and 42 and the wheel body providing the integral tire bead portion 22 while the annulus 30 in this instance is secured to the wheel body and rim at 31 and 33 and additionally at the point 37. This provides still further hollow cross section constructions box-like in nature at the points 51 and 52, whereas in this instance reinforcing ribbing at 53 is in the outboard corner of the rim member as distinguished from the inboard manner of Figure 3.

In Figure 5 the ribbing of the rim annulus 53 is similar to that of Figure 4 while utilizing the rim bead at 22 similar to Figure 2, but creating the hollow bead at 24 from an integral portion of the annulus 30 instead of from the rim member 23 itself. In Figures 6, 7 and 8, this theme is still followed utilizing, however, a solid inboard rim bead at one side and a hollow type at the other. In Figure 7 the hollow construction is limited to the tubular portion of the rim flange per se, whereas in Figure 8 this tubular construction additionally includes a part 42 adjacent the drop center side wall, and in Figure 6, this tubular construction is irregular in cross section shape and involves both the rim flange and the drop center gutter portion as one member. In this arrangement as well as in Figure 11, the common zone of securement at point 61 is attained between the drop center base and the wheel body. In Figures 7, 8, and 9 the securement of the wheel body to the angle between the tire bead seat and the tire retaining side wall is attained at point 63, the construction of Figures 6, 7, 8 and 11 avoiding the additional annulus 30 and the other figures utilizing the same. As corresponding ordinals represent the similar parts of the various figures, a ready appreciation of the construction is easily obtained.

The construction of Figure 9 involves a variation of the construction of Figure 2 by changing the outboard member to a wheel appearance member 20 having a peripheral bead 22 welded to a straight side rim member 23 at 67 and a back demountable type wheel member having the mounting flange 65 and wheel body 66 welded to the front member at 31 and to the drop center at 33, and additionally welded to the rim at 64 in the tire bead seating zone and having an inturned flange 73 welded to the rim member at 74.

In Figure 10 the construction of Figure 3 ranges the annulus 30 in substantially an interlocking corrugated form through the fastening zone 32.

While by way of illustration and example I have described my invention in connection with a preferred embodiment thereof as to structure, and the preferred manner of practicing it, it will be obvious to those skilled in the art, after understanding the foregoing, that various changes and modifications may be made without departing from the spirit or scope of the appended claims to cover all such modifications and changes.

What I claim is:

1. A vehicle wheel comprising a rim annulus of the drop center type having tire bead seating portions, a disc wheel body, the outer peripheral portion of said disc curving inwardly and secured to one of said tire bead seating portions forming a hollow tire retaining flange and a second annulus an inner portion of which is secured to the disc wheel body and the outer periphery of which is curved inwardly and secured to the second of said bead seating portions to form a second hollow tire retaining flange.

2. A vehicle wheel comprising a rim annulus of the drop center type having drop center side walls, tire bead seats extending laterally from the side walls and flanges forming continuations of the bead seats and extending radially outward and away from the said bead seats, a disc wheel body, the outer peripheral portion of said disc curving inwardly and over one of said radially outward extending flanges of the rim bead seat and secured thereto forming together with said flange a hollow tire retaining portion, a second annulus secured to the disc wheel body and drop center base portion, the outer periphery of said annulus curving inwardly and over the second radially outward extending flange of the rim bead seat and secured thereto forming together with said flange a second hollow tire retaining portion.

3. A vehicle wheel comprising a rim annulus of the drop center type having drop center side walls, tire bead seats extending laterally from the side walls and flanges forming continuations of the bead seats and extending radially outward and away from said bead seats, a disc wheel body, said disc wheel body secured to the drop center portion of the rim, the outer peripheral portion of said disc curving inwardly and over one of said radially outward extending flanges of the rim bead seat and secured thereto forming together with said flange a hollow tire retaining portion, a second annulus secured to the disc wheel body and drop center base portion, the outer periphery of said annulus curving inwardly and over the second radially outward extending flange of the rim bead seat and secured thereto forming together with said flange a second hollow tire retaining flange.

CAROLUS B. EKSERGIAN.